United States Patent [19]
Graham

[11] 3,836,345
[45] Sept. 17, 1974

[54] LAMINATED GRINDING WHEEL
[75] Inventor: Richard H. Graham, Cincinnati, Ohio
[73] Assignee: Cincinnati Industries, Inc., Cincinnati, Ohio
[22] Filed: Aug. 9, 1971
[21] Appl. No.: 170,333

Related U.S. Application Data
[63] Continuation-in-part of Ser. No. 784,032, Dec. 16, 1968, abandoned.

[52] U.S. Cl.................................. 51/297, 51/298
[51] Int. Cl............................................ B24d 11/02
[58] Field of Search....................... 51/297, 298, 293

[56] References Cited
UNITED STATES PATENTS
1,954,655  4/1934  Stratford.............................. 51/297
2,405,524  8/1946  Sharpe et al......................... 51/297
2,952,951  9/1960  Simpson............................... 51/295
3,014,795  12/1961  Schmidlin........................... 51/297
3,176,437  4/1965  Lanyon................................ 51/297

Primary Examiner—Donald J. Arnold
Attorney, Agent, or Firm—John W. Melville; Albert E. Strasser; Stanley H. Foster

[57] ABSTRACT

A laminated grinding wheel composed of a plurality of plies of universally stretchable creped paper bonded together by means of a thermosetting resin, with layers of abrasive grit particles interposed between adjoining plies of the creped paper, the grit particles being embedded or nested in the gatherings of the creped sheets which effectively stretch and flex to receive the grit particles with essentially negligible puncturing of the creped paper plies as the laminated structure is molded under pressure prior to curing.

7 Claims, 6 Drawing Figures

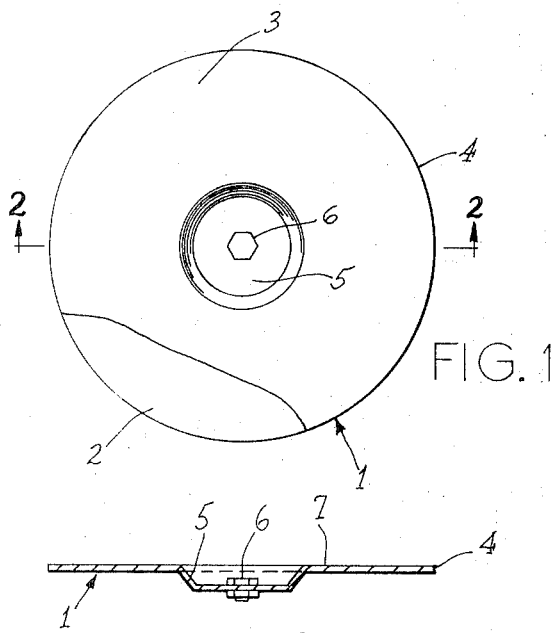
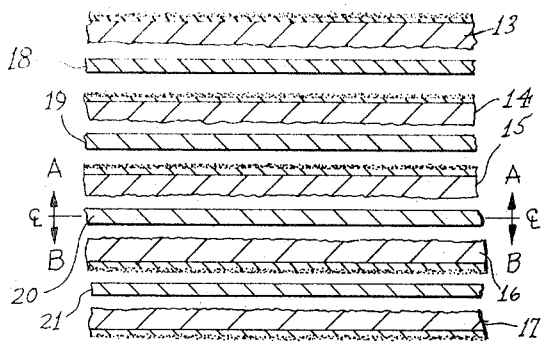
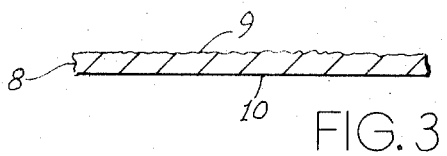
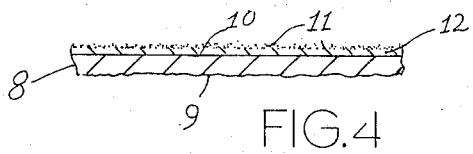
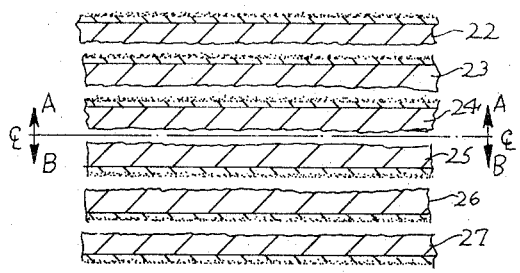

LAMINATED GRINDING WHEEL

BACKGROUND OF THE INVENTION

This is a continuation-in-part of copending application Ser. No. 784,032, filed Dec. 16, 1968, entitled "Laminated Grinding Wheel" and now abandoned.

While grinding wheels have hitherto been produced utilizing a plurality of plies of woven fabric and/or nonwoven fabric and even paper, the resultant grinding wheels have a relatively short useful life and hence must be replaced at rather frequent intervals. By way of example, a current practice in the industry is to form grinding wheels by laminating together a plurality of plies of so-called grit paper, with or without the interposition of plies of a mat paper, which is a non-grit carrying stock utilized to enhance the flexural and tensile strength of the resultant grinding wheel and also make it less agressive, i.e., reduce the degree to which it bites into the material being acted upon by the wheel.

In a typical construction, the grit paper is formed by a felting process, fibers in the form of cotton linters being deposited on a traveling belt together with grit particles of the desired size, a bonding adhesive being utilized to bond the fibers and grit particles together to form a grit paper in which the grit particles are essentially surrounded and covered by the fibers. The mat paper also comprises a non-woven fabric formed by a felting process.

The number of plies of grit paper and/or mat paper utilized in a given grinding wheel normally depends upon the thickness of the finished wheel. Typically, a ⅛ inch thick wheel may comprise 8 plies of grit paper and 6 plies of mat paper, the grit paper having a thickness of approximately 0.050 inch and the mat paper a thickness of 0.030 inch per sheet. Most grinding wheel manufactures die cut the plies to disc form and then make a lay-up of the desired thickness, the plies being first saturated with a phenolic resin which, upon subsequent curing, bonds the plies together into an integral disc. The saturated lay-up is molded under heat and pressure usually in an open type mold having plain top and bottom circular plates which act to compress the lay-up and at the same time provide sufficient heat to cure the phenolic resin. In a typical molding operation, the lay-ups are cured at 300°–325°F. for fifteen minutes at a pressure of from 1200–2800 psi, with the dies opened momentarily after from one to five minutes to release entrapped gases.

Following molding, it is customary to dress the edges of the wheels to remove irregularities which occur about their peripheries and also to remove the tongues or tabs which are customarily made in the plies of both the grit paper and the mat paper. To explain, where the paper is felted, it has a well defined fiber orientation or grain and in forming the lay-up it has been found necessary to overlay the successive plies so that their respective grains are angularly related with respect to each other. This is conventionally done by providing a small tab on the periphery of each die cut disc which bears a fixed relation to the grain of the disc and then spacing the tabs a predetermined distance apart about the periphery of the discs as the lay-up is made, thereby assuring that the grains of successive discs will be angularly related with respect to each other.

Somewhat similar grinding wheels have also been produced employing plies of grit paper formed from single stretch creped kraft paper, the successive plies being laid-up with their creping crinkles lying at right angles to each other. In such product, the abrasive grit appears to be loosely applied to the upper surface of each sheet of the paper stock with the interposition of a non-grit bearing mat paper between the grit carrying sheets.

While grinding wheels manufactured in accordance with the foregoing techniques having been successufly used for a number of years, they deteriorate rapidly in use and must be frequently replaced, which adds materially to the users grinding costs. It has now been discovered that laminated grinding wheels can be produced from paper stock which have a useful life more than double, and even from three to four times greater than comparable laminated wheels of the types characterized above.

RESUME OF THE INVENTION

The present invention is based on the discovery that the useful life of laminated paper grinding wheels can be materially increased if the grit paper and the mat paper are formed from a universally stretchable creped paper. When such universally stretchable paper is processed in accordance with the teachings of the invention, grinding wheels are produced which, while basically of comparable kind and cost to the prior art products, are infinitely superior in performance and longevity. While not wishing to be bound by theory, it would appear that the dramatic increase in performance is due to the fact that the fibers of the paper are not ruptured during molding but rather the paper plies retain their imperforate character, the universally stretchable character of the paper permitting it to expand and stretch around the grit particles without perforating the paper, the grit particles being effectively nested in pockets which form in the plies as they are compressed during the molding of the lay-up. In contrast, a careful examination of grinding wheels produced by the prior art methods described herein reveals that substantial rupturing of the fibers takes place during the molding operation with the paper plies being repeatedly punctured by the grit particles. Such action not only materially weakens the strengh characteristics of the wheel but additionally adversely affects the bond between the paper plies and the grit particles, with the result that the grit particles become loose and are more readily displaced and dislodged during grinding.

From tests which have been made it appears that the lack of fiber rupture is an essential factor in the production of superior grinding wheels. For example, test specimens of grinding wheels made in accordance with the present invention show an average of less than one puncture per field when viewed through a magnifying lens having a field diameter of ¾ inch, whereas conventional prior art grinding wheels formed from felted paper plies, as previously described, exhibit on the average in excess of fifty such perforations per ¾ inch diameter field. The use of a single stretch creped paper does not result in a significant reduction in the number of perforations in the plies, nor does the inclusion of reinforcing materials, such as Fiberglas scrim or fibers, materially improve the useful life of the wheels. Yet where universally stretchable creped paper is utilized, a truly extraordinary reduction in fiber rupture and puncturing of the sheet is realized. This is particularly surprising in view of the fact that the grit covered sheets, as well as the interleaved mat paper sheets, are impregnated with a laminating resin which effectively acts to immobilize the sheets at the time the molding pressure is applied and hence acts to prevent them from stretching. This coupled with the fact that the grit particles are extremely sharp and jagged would lead to the conclusion that the sheets would be readily punctured when molding pressure is applied, but as previously indicated such action does not take place and the molded products exhibit minimal puncturing and fiber rupture.

In accordance with the invention both the grit paper and the interleaved sheets of mat paper are formed from universally stretchable creped paper. In the case of the grit paper, it is preferably precoated on one side with a heat curable phenolic resin to size the sheet so that it will readily accept a bonding adhesive, which is also preferably a phenolic resin, by means of which the grit particles are adhered to the sheet. The grit particles will normally comprise aluminum oxide, although other abrasive materials may be employed, inclusive of refractory materials, such as silicon carbide. The mat paper, which may be of the same basic weight as the grit paper, is also treated with a phenolic resin, which is preferably the same resin as is used to size the grit paper. After preparation, the grit and mat papers may be conveniently rolled and hence handled in bulk since, in most instances, the grit and mat papers will be supplied as such to the grinding wheel manufacturer who will fabricate the materials into wheels.

In the hands of the fabricator, the grit and mat paper may be die cut to the desired disc shape, which will normally have diameters of from 5 inches to about 24 inches, whereupon lay-ups will be made composed of alternate layers of grit paper and mat paper, the number of plies being determined by the desired thickness of the finished grinding wheel, which is usually between 1/16th inch to 3 inches. The lay-ups so-formed are then placed in a suitable press, which may comprise heated upper and lower platen members to which pressure may be applied. As a practical matter, conventional molding equipment currently used by grinding wheel manufacturers may be readily employed, although it has been found that the press cycle may be reduced from the conventional fifteen minute cure to about ten minutes.

As opposed to prior art practices, it is not necessary to orient the plies in any particular relationship to each other; rather, the plies may be stacked one upon the other in random orientation, and consequently the tabs utilized by the prior art to establish grain direction are not required. This in turn simplifies the dressing in that there are no tabs to be removed.

DESCRIPTION OF THE DRAWINGS

FIG. 1 is a plan view with parts broken away of a grinding wheel in accordance with the invention.

FIG. 2 is a vertical sectional view taken along the line 2—2 of FIG. 1.

FIG. 3 is an enlarged fragmentary sectional view of a sheet of universally stretchable creped paper.

FIG. 4 is an enlarged fragmentary vertical sectional view of a sheet of universally stretchable creped paper after the grit particles have been applied.

FIG. 5 is an exploded vertical sectional view illustrating the arrangement of the plies of a lay-up composed of alternate layers of grit paper and mat paper prior to molding, with the plies of grit paper facing outwardly from the effective center of the lay-up.

FIG. 6 is an exploded vertical sectional view showing a lay-up composed solely of plies of grit paper, again illustrating the arrangement of the plies with the grit facing outwardly from the center of the lay-up.

DESCRIPTION OF THE PREFERRED EMBODIMENT

Referring first to FIGS. 1 and 2 of the drawings, the laminated grinding wheel 1 is composed of a plurality of alternate layers of mat paper 2 and grit paper 3 bonded together under heat and pressure by means of a thermosetting adhesive, the finished wheel being edge dressed at 4 to provide a finished periphery. The grinding wheel may comprise a planar surface, which is common to the so-called cutoff wheel, or, as illustrated, the hub or center portion 5 may be offset from the plane of the grinding portion of the disc during molding so that the mounting assembly 6 does not project beyond the level of the abrasive surface 7 of the disc, thereby forming a so-called depressed center wheel.

The size of the disc does not constitute a limitation on the invention, although for most purposes the discs will have a diameter of from about 5 inches to about 24 inches and a thickness of from about ⅛ inch to ¼ inch, although wheels may be fabricated having diameters up to as much as 72 inches and thicknesses of from 1/16 inch to 3 inches and even greater.

The basic material used in the manufacture of the grinding wheels is a universally stretchable paper, preferably a creped paper characterized by crossing sets of creping crinkles or gatherings of relatively fine and uniform nature. Such universally stretchable creped paper can be made in accordance with the teachings of one or more of the following United States patents:

| W. C. Kemp, | No. 2,008,181 | Issued July 16, 1935 |
| W. C. Kemp, | No. 2,008,182 | Issued July 16, 1935 |
| W. C. Kemp, | No. 2,071,347 | Issued Feb. 23, 1937 |
| W. W. Rowe, | No. 2,399,256 | Issued Apr. 30, 1946 |
| P. W. Dorst | No. 2,494,334 | Issued Jan. 10, 1950 |
| W. W. Rowe, | No. 2,567,967 | Issued Sept. 18, 1951 |
| W. W. Rowe, | No. 2,610,935 | Issued Sept. 16, 1952 |
| W. W. Rowe, | No. 2,998,841 | Issued Sept. 5, 1961 |

The universally stretchable sheets are normally creped by means of a very thin layer of a positive creping adhesive which is used to adhere the sheets to the creping drum. This thin layer of adhesive does not appreciably adversely affect the porosity and permeability of the paper; and consequently, for practical purposes, the presence of the creping adhesive may be disregarded insofar as the instant invention is concerned. It serves no known function once the paper has been creped and its presence has no known effect upon subsequent processing in accordance with the invention.

The paper itself will normally comprise ordinary kraft paper, although it may be formed of any of the chemical or mechanical pulps current in the art having fibers which are uniformly small in diameter. A sheet of such paper is diagrammatically illustrated at 8 in FIG. 3, the paper being characterized by creping crinkles or gatherings 9. Characteristically, such universally stretchable crepe paper is distinguishable by the visually detectable creping crinkles 9 on one side, while having virtual smoothness or the visual absence of creping crinkles on its opposite side 10, which was the side in contact with the creping drum during the creping operation.

The basis weight of the creped paper does not constitute a limitation on the invention, although for the majority of grinding wheels in general use, a basis weight of 40 pounds per ream (3000 sq. ft.) before creping has been found highly suitable. However, the basis weight of the paper before creping may vary from a minimum of 20 pounds per ream to 90 pounds per ream or even higher. The lower weights are preferred in order to increase the number of plies and hence the quantity of grit particles which can be incorporated in a given wheel, although where very coarse grit is to be employed, as for example in wheels designed to cut cement, the heavier paper weights are more suitable.

In accordance with the invention, it is preferred to have balanced stretchability in both the longitudinal and lateral directions. Balanced stretchability may be defined as a substantial uniform or equal degree of stretchability in both directions. Stretchabilities of about 30 percent in both the longitudinal and lateral directions have been found to be highly suitable for most purposes, although where extremely fine grit particles are being employed the stretchabilities may be as little as 10 percent, whereas where relatively coarse granules are employed the stretchability may be as much as 65 percent. In selecting the stretchability of the paper stock, the basic consideration is the provision of a sheet having sufficient stretchability to permit the sheet to accept the grit particles during molding without rupturing the fibers and puncturing the sheet. Such expansion appears to result in the formation of pocket-like cavities in which the granules are nested and retained.

In forming grit paper from the universally stretchable crepe paper it has been found desirable to first apply a sealer or sizing to the surface of the sheet on which the granules are to be deposited. The purpose of such precoating is to fill the fiber surface and at the same time provide a barrier which will prevent the subsequently applied bonding adhesive from drinking into the sheet. This assures the presence of a discrete surface layer of the bonding resin to which the grit particles may readily adhere and at the same time reduces the quantity of bonding resin needed to insure a good bond with the grit particles.

For sizing purposes, it is preferred to employ a liquid thermosetting resin, such as Varcum 3395 manufactured by Reichhold Chemicals, Inc. which is a thermosetting phenol formaldehyde resin having a viscosity of 330–400 centipoises at 66–70 percent solids and a water tolerance of 100–150 percent, made by reacting phenol with more than an equal molar proportion of formaldehyde in the presence of an alkaline catalyst. The resin may be applied using standard coating equipment, such as a stack coater, in accordance with standard sizing techniques, with the coating applied to the relatively smooth side 10 of the sheet. Preferably, the coating is applied in a quantity of 25 pounds per ream (3000 sq. ft.) of paper treated, although as little as 14 pounds per ream may be employed, particularly with lighter basis weight stock. Conversely, as the basis weight increases, the quantity of sizing resin may be increased, although quantities substantially in excess of 25 pounds tend to become uneconomical since a primary function of the sizing treatment is to minimize the drinking-in of the subsequently applied grit bonding resin.

The grit bonding resin itself is also a thermosetting resin, such as Resinox 594 manufactured by Monsanto Chemical Company, which is a heat curing unmodified phenol formaldehyde resin containing substantially 65 percent resin by weight. A filler, such as cryolite, is added to the resin, the filler comprising 35 percent by total weight of the coating as applied. Where the sheet has been previously sized, a coating of 20 pounds per ream (320 sq. ft.) has been found ideally suited to bond the grit particles to the sheet, although the quantity of the coating may be varied depending upon the size of the grit particles. Again, the coating will be applied to the stock using conventional coating equipment, such as roll applicators, whereupon the grit particles will be applied.

The grit particles, as previously indicated, will comprise an abrasive material, such as aluminum oxide or silicon carbide, preferably applied in a quantity sufficient to provide an essentially "closed coat" in which at least about 90 percent of the surface area is covered by the granules in a uniformly distributed manner. This amounts to a uniformly distributed coating of from about 65 to 70 pounds per ream (320 sq. ft.) where 24 grit size particles are used. Grit sizes are in accordance with U.S. Bureau of Standards Commercial Standard CS 271-65. Particles having a 24 grit size are in general use in the industry and approximately 95 percent of the industry volume of grinding wheels utilize 24 grit size abrasive particles. However, the grit particles may be varied from 12 to 320 grit size depending upon the particular use to be made of the finished wheel. While a "closed coat" is preferred, it is recognized that as the size of the grit particles is increased, a smaller percentage of the surface area of the sheet will be covered due to the larger particle size. In addition, as the grit particle size is increased, the stretchability of the grit paper should also be increased to accommodate the larger grit particles.

As illustrated in FIG. 4, the grit particles 11 are applied over the coating of bonding resin 12. The grit particles will be applied to the coated base stock while the bonding resin is still essentially liquid or at least sufficiently tacky to bond the particles to the sheet, whereupon the grit paper will be dried and may be conveniently rolled for shipment and storage.

It is also preferred to treat the mat paper with a thermosetting resin, which may be the same resin employed to size the grit paper. As in the case of the sizing resin applied to the grit paper, the mat paper sheets may be treated with the resin in a quantity of from 14 to 25 pounds per ream (3000 sq. ft.) of base stock. Essentially, the objective is to apply the resin in a quantity such that during subsequent molding there will be sufficient resin present to effectively unite all of the plies to form an integral structure in which the resin is present as an essentially continuous phase. However, in instances where the coating of bonding resin on the grit paper sheets is relatively heavy, sufficient resin may be present on the grit paper layers themselves to saturate the mat paper plies during molding, and in such instances the mat paper sheets need not be treated with the resin, although as previously indicated such treatment is preferred in order to insure complete saturation of all the plies during lamination.

In making lay-ups from the grit paper and/or the mat paper, it is not necessary to take into account the grain or fiber orientation of the paper plies, although it has been found desirable, particularly in planar cutoff wheels, to arrange the plies so that their grit covered surfaces face outwardly with respect to the effective center plane of the lay-up. Where mat paper plies are interleaved between the plies of grit paper, it is also preferred to position a layer of mat paper between the innermost oppositely directed plies of grit paper even though such plies would otherwise have their back surfaces juxtaposed. Thus, with reference to FIG. 5, which illustrates a lay-up composed of 5 plies of grit paper and 4 plies of mat paper, the plies 13, 14, and 15 are facing outwardly in the direction of the arrows A, whereas the grit paper plies 16 and 17 face outwardly in the opposite direction, as indicated by the arrows B, the dashed line CL indicating the effective center plane of the lay-up, although in this instance there is one more ply of grit paper facing in direction A due to the uneven number of plies of grit paper in the lay-up. Of course where there are an even number of plies of grit paper, an equal number will face in each direction. The plies of mat paper 18, 19, 20, and 21 are sandwiched between the plies of grit paper; and while the mat paper plies may be arranged to face outwardly, i.e., with their surfaces 10 (as illustrated in FIG. 3) facing in the direction of the arrows A—A and B—B, depending upon whether they lie to one side or the other of center plane CL, such arrangement is not essential and the mat paper plies may face in either direction in indifferent order. It will be noted that mat paper ply 20 lies between the non-grit carrying surfaces to the two intermediate grit paper plies 15 and 16, so that effectively there are three thicknesses of universally stretchable paper in the middle of the lay-up. While the function of this multiple thickness center or core is not understood, it appears to act as a cushion during the pressing and molding operation and is believed to facilitate the expansion of the plies and hence implements the nesting of the grit particles without rupturing the paper fibers and puncturing the plies.

A similar effect is realized where the mat paper plies are omitted. Thus, as illustrated in FIG. 6, a lay-up may be made composed of six plies of grit paper, the plies being arranged with the grit surfaces of plies 22, 23, and 24 facing in the direction of the arrows A—A and the grit surfaces of plies 25, 26, and 27 facing in the direction of arrows B—B. Even here, however, the rear surfaces of plies 24 and 25 are juxtaposed and hence there is at the center or core of the lay-up a multiple ply cushion of universally stretchable paper. It will be understood, of course, that the number of plies illustrated in FIGS. 5 and 6 is exemplary only and may be varied depending upon the desired thickness of the wheel being produced. A nine ply lay-up such as that shown in FIG. 5 has been found to be particularly suited for the production of an ⅛ inch thick grinding wheel utilizing paper stock having a 40 pound basis weight before creping, using 24 grit size particles.

In the formation of depressed center wheels, it has been found that the grit covered surfaces of the plies need not be arranged to face outwardly with respect to the effective center plane of the lay-up. Rather, highly satisfactory wheels have been produced with all of the grit paper plies facing in the same direction, preferably toward the concave surface of the wheel. This is believed to be due to the fact that a depressed center wheel normally contacts the work at an inclined angle, whereas a cutoff wheel contacts the work at right angles to the surface to be cut.

In the molding operation, the lay-ups are preferably molded in an open mold having opposing planar platens which are heated, usually to a temperature of from 300°F. to 325°F., the lay-up being pressed to stops defining the thickness of the finished wheel at pressures of from 1800 to 2800 psi. Such molding technique is often referred to as hot pressing. Pressing times will vary depending upon the thickness of the wheel being formed, although for most purposes a pressing time of about 10 minutes is satisfactory, which is below the standard 15 minute press treatment employed in the art for conventional felted paper wheels. Preferably the platen members will be momentarily opened after from 1 to 5 minutes to release entrapped gases generated as the resin is cured.

Following molding, the molded blanks are edge dressed, which may be conveniently done by banking a number of the blanks on a common rotating shaft and utilizing a diamond tipped cutter to finish their peripheries. In the event the lay-ups are not pre-cut to disc shape but rather are laminated in sheet form, the laminated sheets following curing are subjected to the action of a stamping die mounted on a hydraulic press which blanks out finished discs, which do not require edge dressing.

Grinding wheels made in accordance with the instant invention have a high density and a high grit particle to creped paper stock ratio, which factors are believed to contribute to their effectiveness. For example, on a weight basis calculated in terms of a ream of 320 square feet, the weight ratio of the grit particles to the creped paper stock will be from about 8.8:1 to 9.1:1, the ratio of the grit particles to the thermosetting resin (including filler and sizing resin) will be from about 8.8:2.9 to 9.5:3.0; and the ratio of total resin and filler to paper will be from about 2.9:1 to 3.0:1. In spite of the massive quantities of grit particles which are present on the grit paper plies, the integrity of the paper plies is retained without material fiber rupturing and puncturing of the plies. This materially enhances both the flexural and tensile strength of the wheels so as to constitute them size for size vastly superior to grinding wheels formed from either felted stock or single stretch creped paper as heretofore produced. Based on actual tests, wheels produced in accordance with the invention outperformed comparable prior art wheels by as much as 200 to 500 percent in terms of grinding efficiency, which is measured by dividing the weight of material removed by the wheel by the percentage of wheel weight loss.

Modifications may be made in the invention without departing from its spirit and purpose. Various such modifications have already been set forth and others will undoubtedly occur to the worker in the art upon reading this specification. There are of course literally thousands of thermosetting resins which are commercially available, and while the best materials presently known to applicant have been set forth, there are numerous other thermosetting resin compositions possessing comparable characteristics which may be employed, either singly or in combination, to effectively laminate the grit and/or mat paper layers into an integral structure. Typical examples of such resins are the amino resins, including urea-formaldehyde and melamine-formaldehyde; the epoxy resins, particularly with catalysts of amines, polyamides and anhydrides; epoxy modified phenolic resins; and diallyl phthalate (DAP) in polymeric form. Resorcinol reacted with formaldehyde and alkyd molding compounds may also be employed, although these materials are not as practical due to their short shelf life between coating of the paper plies and curing of the wheel lay-ups.

It is also to be understood that the various resins may be utilized singly or in combination. For example, the grit paper size coat may comprise phenol-formaldehyde resin, and the grit bonding resin an epoxy resin; and in the same lay-up, the mat paper may be treated with urea-formaldehyde resin. Melamine/phenolic mixtures are also in common use for molding, and lay-ups can be formed of different treated plies of phenol-formaldehyde and melamine-formaldehyde, for example.

Various fillers also may be employed, and in addition to cryolite, materials such as calcium fluoride, antimony-oxide, potassium sulfate, potassium chloride, barium sulfate, zinc sulfide, iron sulfide, and antimony trisulfide may be used. The fillers are active and impart varying effects on both resin cure and wheel performance. These properties are well-known in the art and the selection of a particular filler will depend on the properties desired. For example, zinc sulfide will decrease resin flow while acting to harden grinding action, whereas potassium sulfate, while also decreasing resin flow, will soften grinding action but increase wheel strength. While in most instances the wheel manufacturers will fabricate the lay-ups from rolls of grit paper and mat paper which have been supplied to the manufacturer, it is also within the spirit of the invention to supply the wheel manufacturer with complete lay-ups in which the layers of grit paper and/or mat paper have been cut to size and arranged in lay-up form by the producer of the basic materials. It is also within the spirit of the invention to incorporate Fiberglas reinforcement in the wheels. Such reinforcement is a safety factor in that it adds to the flexural strength of the wheels and helps prevent the wheels from flying apart at high rotational speeds.

It is also within the spirit of the invention to mold the grinding wheels using either post curing or cold pressing techniques. For example, wheels which have been previously hot pressed may be subjected to a post cure by placing them in an oven and subjecting the wheels to a slow temperature rise of from 7°F. to 30°F. per hour to a maximum heat of 325°F. to 375°F., followed by a gradual cooling to prevent warpage, the total cycle taking from 20 to 48 hours. Such post curing treatment has been found to further enhance the grinding efficiency of wheels produced in accordance with the invention.

Where the wheels are cold pressed, the lay-ups preferably will be die cut to approximate final diameter and arbor hole dimensions and the lay-ups pressed at room temperatures for 1 to 3 minutes to stops which establish wheel thickness. The lay-ups are then removed from the press and stacked on a metal dowel rod of slightly smaller diameter than the arbor holes, with metal plates (flat for cutoff wheels or shaped for depressed center wheels) and release sheets positioned between adjoining lay-ups, and pressure is applied to the stack so formed by clamps or the like to maintain the stack in compressed condition. The stack is then placed in an oven and cured for about 20–24 hours at a temperature of from 325°F. to 375°F.

Instances also may be encountered wherein it is desirable to "soften" the cutting action of the wheel, even at the sacrifice of grinding efficiency. It has been found that such "softening" may be achieved without sacrificing bursting strength by utilizing mat paper plies treated with a synthetic rubber, such as neoprene or styrene-butadiene, rather than with thermosetting resin. Such expedient may be employed in instances where the grinding wheel user requires a wheel having less than optimum grinding efficiency.

The embodiments of the invention in which an exclusive property or privilege is claimed are defined as follows:

1. A laminated grinding wheel formed from a plurality of plies of grit paper bonded together under pressure by thermosetting resin which is essentially rigid when cured,
   said plies of grit paper each being formed from universally stretchable paper stock having substantially equal stretchability both longitudinally and laterally of from at least 10 to 65 percent in each direction and a basis weight before creping of from 20 to 90 pounds per ream (3000 sq. ft.), and having one surface thereof exhibiting visible creping crinkles and an opposite surface which is essentially smooth;
   said crepe stock being initially sized on its smooth side with a thermosetting sizing resin and having a layer of compatible thermosetting bonding resin containing an active filler applied over the dried sizing resin, the weight ratio of total thermosetting resin and filler to paper stock being from 2.9:1 to 3.0 to 1;
   abrasive grit particles having a grit size of from 12 to 320 initially bonded to the smooth side of the paper stock by the bonding resin in a uniformly distributed manner and in a weight ratio of grit particles to paper stock of from about 8.8:1 to 9.5:1, with the basis weight and percentage of stretchability of the paper stock being increased as the size of the grit particles is increased, said thermosetting bonding resin acting, upon being cured under pressure, to integrally bond the paper plies and grit particles together to form a rigid wheel, the paper plies as an incident of their compression being stretched and expanded by the grit particles to form particle receiving pockets, with negligible fiber rupture and puncturing of the paper plies by the grit particles.

2. The laminated grinding wheel claimed in claim 1 wherein the grit paper plies are arranged so that their grit covered surfaces face outwardly in opposite directions from the center plane of the grinding wheel.

3. The laminated grinding wheel claimed in claim 2 wherein plies of universally stretchable mat paper are interleaved between the plies of grit paper.

4. The laminated grinding wheel claimed in claim 3 wherein the plies of mat paper are treated with a thermosetting resin.

5. The laminated grinding wheel claimed in claim 4 wherein a layer of universally stretchable mat paper is interposed between the centermost two plies of grit paper, whereby to provide three plies of universally stretchable paper in surface-to-surface contact at the approximate center plane of the wheel.

6. The laminated grinding wheel claimed in claim 5 wherein said grit paper has a stretchability both longitudinally and laterally of about 30 percent in each direction, and wherein said grit particles are of 24 grit size.

7. The laminated grinding wheel claimed in claim 6 wherein said sizing resin is a phenol formaldehyde resin and said bonding resin is an unmodified phenol formaldehyde resin containing substantially 65 percent resin and 35 percent cryolite filler, the parts being by weight.

* * * * *